United States Patent [19]

Drori

[11] 4,105,162
[45] Aug. 8, 1978

[54] REGULATED FLOW-REDUCING DEVICE PARTICULARLY USEFUL FOR DRIP IRRIGATION

[76] Inventor: Mordeki Drori, 89 Zahal St., Kiron, Israel

[21] Appl. No.: 765,297

[22] Filed: Feb. 3, 1977

[30] Foreign Application Priority Data

Oct. 10, 1976 [IL] Israel .................................. 50650

[51] Int. Cl.² .............................................. B05B 1/30
[52] U.S. Cl. ..................................... 239/109; 138/43; 138/46; 239/533.1; 239/542; 239/570
[58] Field of Search ........................... 239/106–109, 239/115, 272, 533.1, 542, 570, 571; 138/37, 40–46; 251/127; 137/484.4, 497, 498, 505.13, 509, 511, 514, 517, 535, 540, 542; 285/DIG. 22

[56] References Cited

U.S. PATENT DOCUMENTS

| 2,511,733 | 6/1950 | Morrison | 138/43 |
| 3,791,587 | 2/1974 | Drori | 239/542 X |
| 3,882,892 | 5/1975 | Menzel | 239/542 X |
| 3,998,391 | 12/1976 | Lemelshtrich | 239/542 |
| 4,011,893 | 3/1977 | Bentley | 239/542 X |

FOREIGN PATENT DOCUMENTS 2,535,732   2/1976   Fed. Rep. of Germany .......... 239/542

Primary Examiner—Evon C. Blunk
Assistant Examiner—Andres Kashnikow
Attorney, Agent, or Firm—Benjamin J. Barish

[57] ABSTRACT

A regulated flow-reducing device particularly useful for drip irrigation comprises a flow-retarding member disposed in a housing, the member being formed with a circuitous fluid flow pathway defined at least in part by recesses formed in both its opposed faces, and a flat regulator member disposed between the flow-retarding member and the housing inlet such that the inlet face of the regulator member is subject to the fluid pressure at the inlet of the housing. The flat regulator member is in contact with and covers the inlet face of the flow-retarding member except for its inlet end to provide communication between the latter and the housing inlet. The flow-retarding member is made of resilient material so that both its recessed faces are deformable by the inlet pressure whereby the cross-sectional area of the recesses on both faces of the flow-retarding member are varied in accordance with the inlet pressure.

6 Claims, 6 Drawing Figures

REGULATED FLOW-REDUCING DEVICE PARTICULARLY USEFUL FOR DRIP IRRIGATION

BACKGROUND OF THE INVENTION

The present invention relates to flow-reducing devices, and particularly to such devices useful as regulated emitters for drip irrigation.

Drip irrigation is increasingly gaining wide-spread use as a means for supplying water, and also fertilizer and other soil additives, to field crops and orchards. In some of the known drip emitter devices, the emission of the water is effected by small openings, but these devices have the serious disadvantage that they easily clog. In other devices, a long circuitous pathway is provided for the water to reduce its pressure so that it eventually discharges in the form of a slow trickle. The known devices of this type, however, usually produce non-uniform outputs because of the pressure drop along the length of the line, the different elevations at which the emitters are located, and the fluctuations in the line pressure. This is highly undesirable, and a number of arrangements have been proposed to correct it, but the known arrangements are usually very costly and/or inefficient.

An object of the present invention is to provide a regulated flow-reducing device particularly useful for drip irrigation and having advantages in the above respects.

SUMMARY OF THE INVENTION

According to a broad aspect of the present invention, there is provided a regulated flow-reducing device particularly useful for drip irrigation, comprising a housing having a disc-shaped end wall, a disc-shaped closure cap, a fluid inlet formed through its end wall, and a fluid outlet; a flow-retarding member diposed in the housing and having an inlet end communicating with the housing inlet, an outlet end communicating with the housing outlet, and a circuitous fluid flow pathway between its ends and defined at least in part by recesses formed in one face thereof facing the housing inlet and in the opposed face thereof facing the closure cap; and a flat disc-shaped regulator member disposed between the housing end wall and the inlet face of the flow-retarding member such that the face of the regulator member facing the housing end wall is subject to the fluid pressure at the inlet of the housing. The flat regulator member is in contact with and covers the inlet face of the flow-retarding member except for its inlet end to provide communication between its inlet end and the housing inlet. The flow-retarding member is made of resilient material so that its two faces are deformable against the regulator member and the closure cap, respectively, by the inlet pressure whereby the cross-sectional area of the recesses on both faces of the flow-retarding member are varied in accordance with the inlet pressure.

A drip irrigation emitter constructed in accordance with the foregoing features has a number of important advantages. First, since the cross-sectional areas of the recesses in the flow-retarding member are varied with the variations in the inlet pressure, the device automatically effects regulation of the output in accordance with variations in the inlet pressure. In addition, since regulation is effected by metering the fluid through a large spread-out cross-sectional area (i.e. all the recesses on the face of the flow-retarding member covered by the regulator member and the face pressed against the closure cap ), a wide range of regulation can be effected with less danger of clogging than would be the case if the fluid flow was metered through a local or concentrated cross-sectional area, such as a restricted opening. Further, the inlet pressure applied to the regulator member continuously forces it against the flow-retarding member, thereby securely holding all the parts firmly in position during use, and obviating the need for close manufacturing tolerances in producing the parts.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
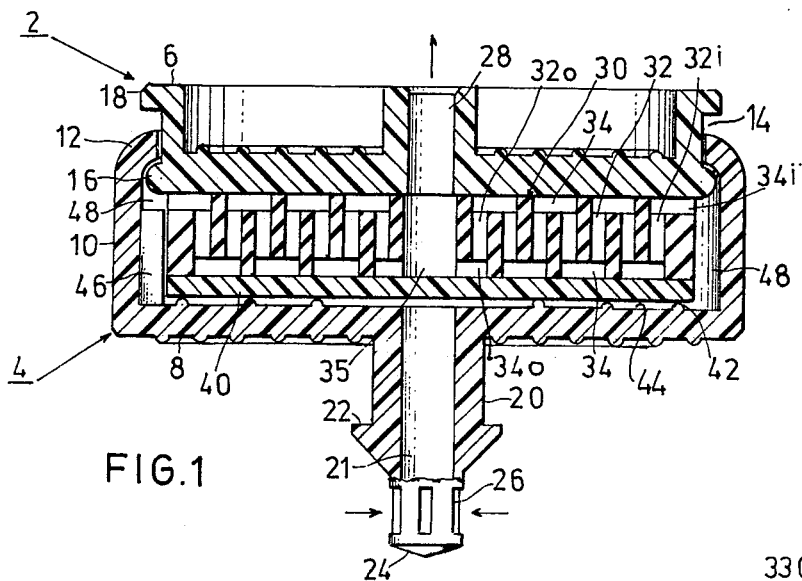
FIG. 1 is a transverse sectional view of one form of drip irrigation device constructed in accordance with the invention.

The drip irrigation device illustrated in FIG. 1 comprises a housing, generally designated 2, including a main section 4 and a closure cap 6 releasably attached thereto by a snap-fit. Main section 4 includes a disc-shaped end wall 8 and a peripheral wall 10 formed with an inwardly-extending annular shoulder 12 at its outer end. Closure cap 6 is formed with an annular recess 14 defining a pair of shoulders 16, 18, which recess is adapted to receive by a snap-fit shoulder 12 of the main housing section 4.

The main housing section 4 includes an inlet in the form of stem 20 for insertion into fluid-carrying pipe (not shown). Stem 20 is formed with an axial bore 21 and with a shoulder 22 engageable with the inner surface of the pipe. Th end of the stem disposed within the pipe is closed at 24 and the bordering wall is formed with slots 26 to filter the water inletted from the pipe into housing 2. A bore 28 formed centrally of closure cap 16 constitutes an outlet from the housing.

Disposed within housing 2 is a disc-shaped flow-retarding member of the type described in my U.S. Pat. No. 3,791,587 of Feb. 12, 1974. This member, generally designated 30, is formed with a large number of holes 32 extending therethrough from one face through its opposite face. Each face is also formed with a plurality of recesses or channels 34 each bridging a pair of holes 32. The recesses 34 on one face overlap those on the other face such that the pair of holes 32 bridged by a recess 34 on one face lead to separate recesses on the opposite face, thereby providing a long circuitous path for the water as it flows through the holes from one to the opposite face of the member. The inlet end of this circuitous pathway is at the outer periphery of the flow-retarding member 30, being constituted of inlet recess $34i$ and inlet hole $32i$; and the outlet end of this circuitous pathway, being constituted of outlet hole $32o$ and outlet recess $34o$, is at the center of the member communicating with an outlet hole 35 formed centrally of the member.

A flat disc-shaped regulator member 40 is disposed within housing 2 between its inlet stem 20 and the confronting face of the flow-retarding member 30. Regulator disc 40 is spaced from the inner surface of end wall 8 of the housing by a plurality of projections 42 formed on that surface, to define a space 44 between wall 8 and the disc. In addition, the periphery of the regulator disc is spaced from the peripheral wall 10 of the housing by a plurality (e.g. three) of ribs 46 formed on the inner surface of wall 10 to provide a space 48 between the disc and the annular wall 10, which space 48 communicates with space 44.

In the embodiment illustrated in FIG. 1, the flow-retarding member 30 is made of resilient (e.g. rubber) material, and the regulator disc 40 is made of rigid (e.g. plastics) material.

The device of FIG. 1 operates as follows: The water inletted via stem 20 passes through spaces 44 and 48 to the inlet recess 34i and hole 32i of the flow-retarding member 30, and then traverses the circuitous pathway constituted by the holes 32 and recesses 34, flowing serially through the recesses on the opposite faces of the flow-retarding member and finally exiting via the outlet hole 32o and recess 34o through the housing outlet 28 formed in the closure cap 6. It will thus be seen that the inlet face (lower) of the regulator disc 40 is subject to the water pressure at the inlet 20 of the housing, whereas its opposite face is subject to the pressure-gradient of the water flowing through the circuitous pathway defined by the holes 32 and recesses 34 in the flow-retarding member 30, this pressure-gradient decreasing from the inlet end (outer periphery of member 30) to the outlet end (centre of member 30) of this pathway.

Now, when the inlet water pressure applied via stem 20 to regulator disc 40 rises, this will cause the disc to press more tightly against the confronting face of the flow-retarding member 30 such as to deform the latter member, thereby decreasing the cross-sectional area of the recesses 34 formed on that face of the member as well as the recesses formed on the opposite face of the member and contacted by closure cap 6. This decrease in the cross-sectional areas of the recesses 34 will lower the rate of flow of the liquid through the circuitous pathway of the flow-retarding member 30, thereby compensating for the higher inlet pressure. On the other hand, if the inlet pressure drops, there will be less deformation of the flow-retarding member 30 and therefore less decrease in the cross-sectional area of the recesses.

It will thus be seen that the device of FIG. 1 automatically regulates the output flow to compensate for variations in the inlet pressure. Since this regulation is spread over a large surface area (i.e., the recesses 34 formed on both faces of member 30), a wide range of regulation can be effected with a small variation in the cross-sectional area at any one location, thereby decreasing the possibility of clogging. In addition, if a particle should become clogged in one of the recesses 34 or holes 32, the pressure will quickly build up which will tend to dislodge the particle and to force it out through the housing outlet 28. Further, since the inlet pressure urges the regulator disc 40 against the flow-retarding member 30, which member is in turn urged against the lower face of the closure cap 6, the parts are firmly held in position by the hydraulic pressure during use. Accordingly, the manufacturing tolerances in producing the parts are less critical, enabling the parts to be produced in volume at low cost.

Figure 2:
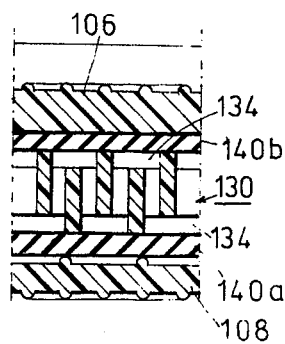
FIG. 2 is a fragmentary view of a modification.
Figure 1A:
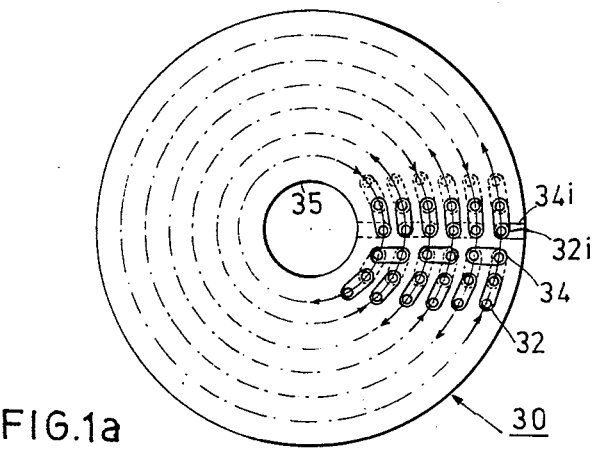
FIG. 1a is a reduced top view of the flow-retarding member.

FIG. 2 illustrates a variation in the device of FIG. 1. In FIG. 2, the flow-retarding member, generally designated 130, is made of rigid material, and two regulator discs 140a, 140b are provided, one covering and bearing against each of the two faces of member 130. Thus, the inlet pressure applied between the end wall 108 of the housing and regulator disc 140a will cause the latter disc to deform and to reduce the cross-sectional area of the recesses 134 on that face of member 130; and similarly, regulator disc 140b interposed between the opposite face of member 130 and the closure cap 106 will also deform to reduce the cross-sectional area of the recesses 134 on that face of the flow-retarding member.

It will be appreciated that, in the modification of FIG. 2, the flow-retarding member 134 could be of resilient deformable material as in FIG. 1, and the two regulator discs 140a, 140b could be of rigid or resilient material. In all other respects, the construction and operation of the device of FIG. 2 are the same as described above with respect to FIG. 1.

Figure 3:
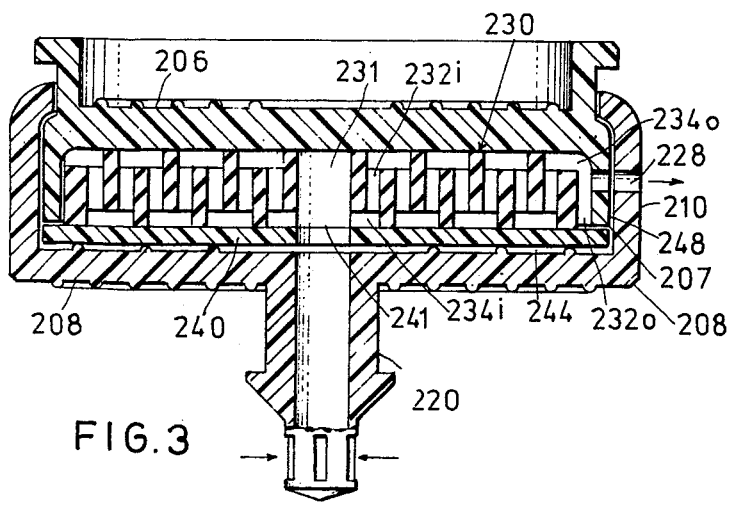
FIG. 3 is a view similar to that of FIG. 1 illustrating a further modification.

FIG. 3 illustrates a further modification, wherein the inlet end of the flow-retarding member, generally designated 230, is at the centre of the member, being constituted of inlet recess 234i and inlet opening 232i; and the outlet end of the member is at its outer periphery, being constituted of outlet opening 232o and outlet recess 234o. In this case, the regulator disc 240 and flow-retarding member 230 are formed with aligned openings 241, 231, respectively, the latter opening communicating with the inlet recess 234i. The housing outlet is constituted of an opening 228 formed in the peripheral wall 210 of the housing. The space 248 between the periphery of the flow-retarding member 230 and wall 210 does not communicate with the space 244 between the regulator disc 240 and the housing end wall 208, but is blocked by the disc 240. For this purpose, disc 240 is of sufficiently large diameter to engage the inner surface of housing wall 210. In addition, the closure cap 206 is formed with a cylindrical extension 207 engageable with the periphery of regulator disc 240 to effect a seal between spaces 248 and 244.

Thus, the water inletted through stem 220 passes through opening 241 in regulator disc 240 and then passes via opening 231 in the flow-retarding member 230, into the inlet recess 234i at the centre of the member. The water then flows through the circuitous pathway in member 230 from a centre to its outer periphery, exiting through outlet opening 232o and outlet recess 234o into space 248 and then through the housing outlet 228.

Figure 4:
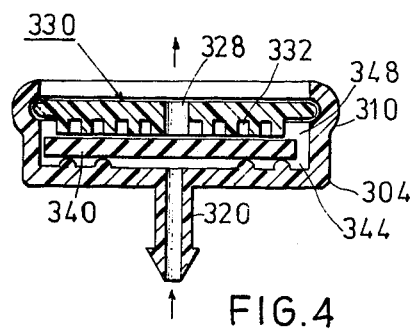
FIG. 4-6 are transverse sectional views illustrating three further forms of drip irrigation devices constructed in accordance with the invention.
Figure 5:
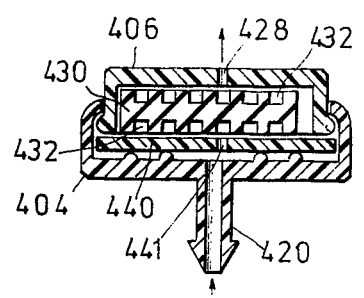

While the invention has been described with respect to a drip emitter using the hole-and-recess type of flow-retarding member, it will be appreciated that it could be used with drip emitters having other types of flow-retarding members. FIGS. 4 and 5 illustrate two examples of other types. In both of these examples, the circuitous pathway between the inlet and outlet ends of the flow-retarding member is defined at least in part by recesses formed in the face of the member confronting the housing intlet, as in above-described FIGS. 1–3 embodiments, and therefore the same technique as described above can be used for regulating the flow through these recesses.

Thus, FIG. 4 illustrates a drip emitter including a known recess-type of flow-retarding member, generally designated 330, wherein the circuitous fluid flow pathway provided by the member is constituted only of a circuitous recess 332 formed on the inner face of the member 330. Recess 332 may be of spiral configuration and may include alternating larger and smaller cross-sectional areas, all as known in this type of drip emitter, to provide a long, circuitous, flow-retarding pathway for the water inletted via stem 320. In the illustrated arrangement, the water flows through the flow-retarding member from its outer periphery inwardly, as in the FIG. 1 embodiment, exiting from the housing outlet 328. This known type of drip emitter does not include a separate closure cap, but the flow-retarding member 330 itself serves as the cap and is snap-fitted into the housing 304.

To provide regulation and the other advantages discussed above in accordance with the invention, a regulator disc 340 is disposed within housing 304 between the inlet stem 320 and the face of member 330 formed with the recesses 332 defining the circuitous pathway for the water before it exits through housing outlet 328. As in the FIG. 1 embodiment, the outer periphery of regulator disc 340 is spaced from the peripheral wall 310 of the housing to provide communication between spaces 344 and 348, and thereby to permit the inletted water to flow to the inlet end of the recesses 332 at the outer periphery of member 330. The operation of the drip emitter in FIG. 4 is otherwise the same as described above with respect to FIG. 1, in that the inletted pressure applied to disc 340 presses same against the inner face of member 330 and decreases the cross-sectional areas of recesses 332 in proportion to the inlet pressure, thereby providing regulation and the other advantages described above with respect to FIG. 1. However, in FIG. 4, the regulator disc 340 is preferably of resilient deformable material, and member 330 is of rigid material, but it will be appreciated that the regulator disc 340 could be made of rigid material, in which case the flow-retarding member 330 would be of resilient deformable material.

FIG. 5 illustrates the invention applied to another known recess-type of drip emitter wherein the recesses, designated 432, in the flow-retarding member 430 providing the circuitous pathway for the water, are formed on both faces of the member. As in FIG. 4, the recesses 432 may be of spiral or other formation to provide the long circuitous pathway, the water inletted via stem 420 first flowing through the recesses 432 on the face of member 430 facing inlet 420, and then flowing through recesses 432 on the face of member 430 facing the closure cap 406, the latter having an opening 428 serving as the housing outlet.

In order to provide regulation and the other advantages of the present invention, a regulator disc 440 is disposed within housing 404 between the inlet 420 and the confronting face of the flow-retarding member 430, disc 440 covering the latter face of the member but being formed with a central opening 441 to provide communication between the inlet stem 420 and the inlet end of the long circuitous pathway in member 430. It will be seen that the arrangement illustrated in FIG. 5 is similar to that of FIG. 3, except for the use of the different type of flow-retarding member, in that the periphery of the regulator disc 440 provides a barrier between the housing inlet 420 and housing outlet 428, directing the water to flow from the inlet through opening 441 in the disc into the centre area of the flow-retarding member 430, whereupon the water flows through the recesses first on one face, then on the opposite face, before exiting through the housing outlet 428.

Preferably, regulator disc 440 is of rigid material, and the flow-retarding member 420 is of resilient deformable material, but if desired, the disc may be made of resilient material and member 430 may be made of rigid or resilient material.

Figure 6:
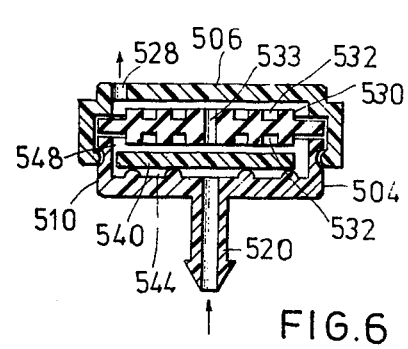

FIG. 6 illustrates a variation of FIG. 5, wherein the inlet to the flow-retarding member 530 is from the periphery of the regulator disc 540, rather from its centre, similar to the arrangements illustrated in FIGS. 1 and 4. Thus, the outer periphery of the regulator disc 540 is spaced from the peripheral wall 510 of the housing to provide communication between spaces 544 and 548, and thereby to permit the inletted water to flow to the inlet end of the recesses 532 at the outer periphery of member 530. As in FIG. 5, the recesses 532 in member 530 are formed on both faces of the member, but in this case the member is formed with a central opening 533 to permit the water flowing from the outer periphery towards the centre to pass to the outlet face of the member. Outlet 528 is formed in the closure cap 506 which is snap-fitted to the housing 504, the flow-retarding member 530 being gripped along its outer periphery between the closure cap and the housing. As in the previously-described embodiments, the regulator disc 540 may be made of rigid material and the flow-retarding member 530 may be made of resilient deformable material; or the disc 540 may be made of resilient material and the member 530 may be made of rigid or resilient material.

Many other variations, modifications and applications of the invention will be apparent.

What is claimed is:

1. A regulated flow-reducing device particularly useful for drip irrigation, comprising: a housing having a disc-shaped end wall, a disc-shaped closure cap, a fluid inlet formed through said end wall, and a fluid outlet; a flow-retarding member disposed in said housing and having an inlet end communicating with said housing inlet, an outlet end communicating with said housing outlet, and a circuitous flow pathway between said ends and defined at least in part by recesses formed in one face thereof facing the housing inlet and in the opposed face there of facing said closure cap; and a flat disc-shaped regulator member disposed between the housing end wall and said one face of the flow-retarding member such that the face of the regulator member facing the housing end wall is subject to the fluid pressure at the inlet of the housing ; said flat regulator member being in contact with and covering said one face of the flow-retarding member except for its inlet end to provide communication between said inlet end and the housing inlet; said flow-retarding member being made of resilient material so that both its faces are deformable against the regulator member and the disc-shaped closure cap, respectively, by the inlet pressure whereby the cross-sectional area of said recesses on both faces of the flow-retarding member are varied in accordance with the inlet pressure 2. A device according to claim 1, wherein said housing end wall includes projections spacing the regulator member therefrom.

3. A device according to claim 1, wherein the inlet end of the flow-retarding member is at its outer periphery, the outer periphery of said regulator member being spaced from the inner face of the housing to provide said communication between said inlet end of the flow-retarding member and the housing inlet.

4. A device according to claim 1, wherein the inlet end of the flow-retarding member is at its centre, said regulator member being formed with a central opening to provide said communication between said inlet end of the flow-retarding member and the housing inlet.

5. A device according to claim 1, wherein said circuitous fluid flow pathway in the flow-retarding member is defined by a plurality of holes extending through said member from one face to the opposite face thereof and a plurality of recesses formed on both faces thereof, each recess bridging a pair of holes, the pair of holes bridged on one face by one recess leading to separate recesses on the opposite face, whereby the recesses provide flow-paths between holes at both faces of the flow-retarding member causing the fluid to flow through the holes in succession, passing back and forth from one to the opposite face of the member before exiting through its outlet end and through the housing outlet.

6. A device according to claim 1, wherein substantially the complete circuitous fluid flow pathway in said flow-retarding member is defined by said recesses on both faces thereof.

* * * * *